United States Patent
Kaercher et al.

[15] 3,687,351
[45] Aug. 29, 1972

[54] COMPOSITE CONTAINER

[72] Inventors: Ralph William Kaercher, Barrington; John Robert Platt, Crystal Lake, both of Ill.

[73] Assignee: American Can Company, Greenwich, Conn.

[22] Filed: Sept. 24, 1970

[21] Appl. No.: 75,013

[52] U.S. Cl. ............... 229/3.1, 229/3.5 MF, 229/4.5, 138/144, 220/DIG. 30
[51] Int. Cl. ........................................... B65d 25/14
[58] Field of Search...229/3.1, 3.5 MF, 4.5; 138/131, 138/133, 138, 139, 143, 144, DIG. 10

[56] References Cited

UNITED STATES PATENTS

| | | |
|---|---|---|
| 3,239,126 | 3/1966 | Arslanian............229/3.5 MF |
| 3,524,779 | 8/1970 | Masters..................229/4.5 X |
| 3,520,463 | 7/1970 | Ahlemeyer................229/4.5 |
| 3,156,401 | 11/1964 | Krause.......................229/4.5 |

*Primary Examiner*—Donald F. Norton
*Attorney*—Robert P. Auber, George P. Ziehmer, Leonard R. Kohan and Ronald A. Schapira

[57] ABSTRACT

A composite beer or beverage container having a body made from disposable materials comprising a spirally-wound ply of thick, strong aluminum or steel foil forming an inner layer, having an organic slip coat on its inside surface and a thermoplastic adhesive coat on its outside surface, and a spirally wound ply of paperboard forming a middle layer, having a thermoplastic adhesive coat on its inside and outside surfaces. The thermoplastic adhesive coats on the outside surface of the foil layer and on the inside surface of the paperboard layer form a plastic-to-plastic bond between the foil layer and the paperboard layer. An extruded plastic forms an outer layer of the composite container body and provides a plastic-to-plastic bond with the thermoplastic adhesive coat on the outside surface of the paperboard layer. The composite body may be sealed with metal top and bottom end closures.

27 Claims, 4 Drawing Figures

Patented Aug. 29, 1972
3,687,351
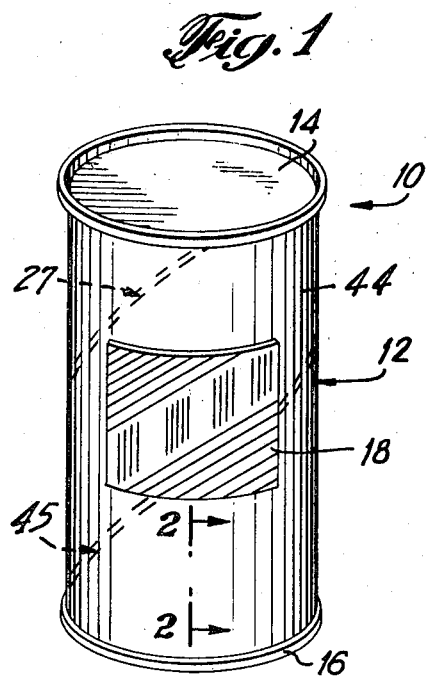
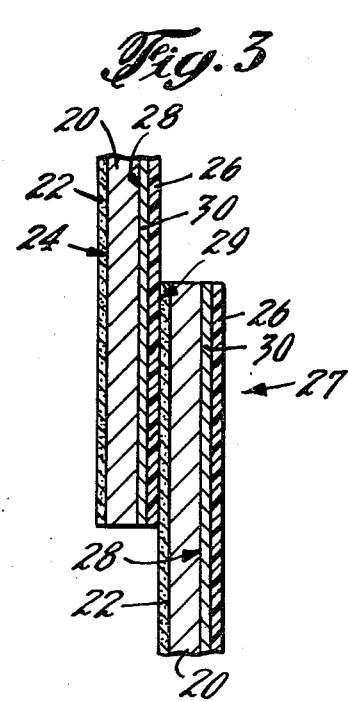
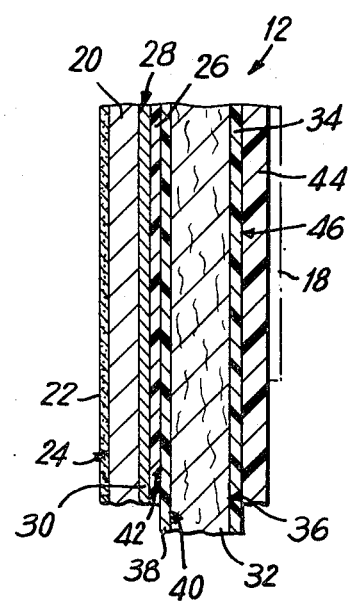
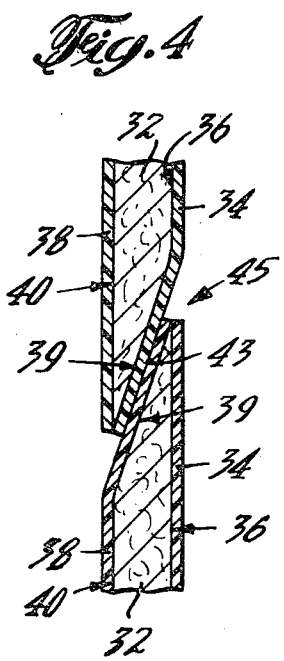
INVENTORS
RALPH WILLIAM KAERCHER
JOHN ROBERT PLATT
BY
Leonard R. Kohan
ATTORNEY

COMPOSITE CONTAINER

BACKGROUND OF THE INVENTION

The present invention relates broadly to containers that may be used for packaging, and is more particularly directed to a body of a composite container capable of packaging a pressurized fluid material, such as a carbonated beverage or beer.

Traditionally, the containers used for packaging carbonated beverages or beer were glass bottles. More recently, cans made of steel, aluminum or a combination of both, have received widespread use for packaging carbonated beverages or beer.

However, a distinct disadvantage, common to both the glass bottle and the metal can, is that both types of containers are not readily disposable by municipalities.

Solid waste disposal is of rapidly growing concern at all levels of federal, state and local government. Single use, non-returnable packaging of all types, i.e., glass and metal containers, is being severely criticized because it contributes a major portion of the total waste. Beer and carbonated beverage containers are especially criticized since they are so conspicuously a major factor in the litter problem.

The composite container body involved in the present invention has build-in degradability which will occur upon exposure to the process of weathering. Also, it is readily burnable, leaving only a small ash residue.

The present composite body of the container preferably utilizes a spirally-wound inner metal foil layer, a spirally-wound middle paperboard layer and an outer extruded plastic layer, the body capable of being sealed at each end with metal end closures.

The spiral winding process for fabrication of the layers is a versatile method for combining several layers of materials so that a degradable ply can be inserted in the center of the body wall without direct exposure to the product on the inside or to the atmosphere on the outside. Such multi-layer construction provides good potential for building in degradability.

Thus, the specific construction of the composite container body is highlighted by its ease of disposability, either by incineration or by disintegration through weathering. Further, the container body does not liberate noxious fumes while it burns. The metal foil is thin enough that it burns or converts to oxide so that only the metal ends of the original container remain as solid residue after incineration. Also, materials having a high caloric value are used in the container body and thereby provide useful assistance to municipal incineration from the standpoint that they help to burn the wet garbage such as discarded fruits, etc. The exterior plastic layer can be made to stress crack upon prolonged exposure to sunlight. When the plastic layer cracks, the paperboard layer is exposed, and this also disintegrates relatively rapidly upon exposure to rain, ground moisture and sunlight.

Recovery and recycling of used beverages and bear containers and salvage of their materials is a particularly desirable method of waste disposal and material recovery. The composite container involved in the present invention advantageously has a materials construction which permits recovery and recycling of a substantial portion of its component materials. The composite container could be processed to separately recover the metal, plastic and paperboard components.

This new composite container body has many more advantages over conventional types of containers, i.e., glass bottles, metal cans and plastic bottles or cans, which will be set forth in connection with the detailed description of the present invention below.

SUMMARY OF THE INVENTION

The new composite container body forming the present invention comprises a single, spirally-wound inner ply of strong, metal foil with an organic slip coat on one side and a primer/thermoplastic adhesive coat on the other side, the metal foil being bonded to a single, spirally-wound middle ply of paperboard with a thermoplastic adhesive coat on the outside or on both sides, the paperboard being bonded to an extruded plastic outer layer. Metal top and bottom end closures may be sealed to the new composite body to form the container.

DESCRIPTION OF THE DRAWINGS

FIG. 1 is a perspective view of the composite container embodying the present invention;

FIG. 2 is an enlarged fragmentary sectional view of the composite container body comprising the present invention taken substantially along the line 2—2 of FIG. 1, illustrating the construction of the container body in greater detail by showing its component parts;

FIG. 3 is an enlarged fragmentary sectional view of the overlap seam in the inner metal foil layer; and FIG. 4 is an enlarged fragmentary sectional view of the skived overlap seam in the middle paperboard layer.

DETAILED DESCRIPTION OF THE PRESENT INVENTION

I. Physical Structure of the Composite Container Body

As a preferred or exemplary embodiment of the instant invention, FIG. 1 shows a composite container, generally designated 10, having a novel composite body, generally designated 12, sealed with a top end closure 14 and a bottom end closure 16 to form a three-piece composite container. The metal end closures 14, 16 may, for example, take the form of an easy-open top end and a standard bottom end. Also the composite body 12 may have a spot label 18 thereon.

As shown in FIG. 2, a single ply of a thick, strong aluminum or steel foil, preferably spirally-wound into tubular form, forms the inner layer 20 of the composite container body 12. The foil layer 20 has an organic slip coat 22 on the inside surface 24 of the layer 20, which protects the foil lining from the contents of the container and allows the body 12 to rotate about and slide along a mandrel of a spiral winder during the container body fabrication process. The foil layer 20 also has a thermoplastic adhesive coat 26 on the outside surface 28 of the layer 20. Depending on the particular metal foil used in the container body construction, a primer coat 30 may be necessary for proper adhesion of the thermoplastic adhesive coat 26 to the foil layer 20.

The single ply of metal foil, in being spirally-wound into tubular form to form the foil layer 20, is spirally-overlapped onto itself, the overlap, generally designated 27 as shown in FIG. 3, having a width within the range of 3/16 inch to ⅜ inch. In the overlap area 27, the thermoplastic adhesive coat 26 on the outside surface 28 of the foil layer 20 forms a plastic-to-organic slip coat bond 29 with the organic slip coat 22 on the inside surface 24 of the foil layer 20.

Preferably, a single ply of unbleached kraft paperboard, spirally-wound into layer form around the spirally-wound foil layer 20, forms the middle layer 32 of the composite container body 12, as illustrated in FIG. 2. As the preferred construction, the paperboard layer 32 has a thermoplastic adhesive coat 34 on the outside surface 36 of the layer 32, and further, a thermoplastic adhesive coat 38 on the inside surface 40 of the layer 32 so that the foil layer 20 and the paperboard layer 32 are bonded together by means of a plastic-to-plastic bond 42. Optionally, it is possible to omit the thermoplastic adhesive coat 38 on the inside surface 40 of the layer 32 and, instead, have a paper-to-plastic bond between the inside surface 40 of the paperboard layer 32 and the thermoplastic adhesive coat 26 on the outside surface 28 of the foil layer 20.

The paperboard edges, generally designated 39 in FIG. 4, are skived so that when the single ply of paperboard is spirally-wound into tubular form, the edges 39 of the paperboard may be spirally-overlapped to provide a paperboard layer 32 having a substantially uniform single ply thickness around the spirally-wound foil layer 20, the overlap, generally designated 45, having a width within the range of 3/16 inch to ⅜ inch. Skiving is defined as beveling or tapering the edges of the paperboard in order to achieve a stepless overlap of the edges. The thermoplastic adhesive coat 34 on the outside surface 36 of the paperboard layer 32 further covers the skived paperboard edge 39, shown on the left in FIG. 4. The thermoplastic adhesive coat 38 on the inside surface 40 of the paperboard layer 32 further covers the skived paperboard edge 39, shown on the right in FIG. 4. These thermoplastic adhesive coats 34, 38 form a plastic-to-plastic bond 43 between the skived paperboard edges 39 in the overlap area 45. Furthermore, the respective overlap areas 27, 45 of the foil layer and the paperboard layer 32 are offset from one another, as shown in FIG. 1, and, thereby, do not intersect each other in the finished composite container body.

A layer of plastic or combination of plastics, preferably extruded onto the spirally-wound paperboard layer 32 with its pre-applied thermoplastic adhesive coat 34, forms the seamless outer layer 44 of the composite container body 12. The thermoplastic adhesive coat 34 on the outside surface 36 of the paperboard later 32 forms a plastic-to-plastic bond 46 with the outer plastic layer 44.

II. Ranges of Construction Materials

It should be emphasized that wide combinations and ranges of materials can be utilized in the present composite container body construction.

A thick, strong aluminum or steel foil, from about 0.00075 to 0.003 inch thickness, with a suitable pre-applied organic slip coat 22 on one side and a 0.0008 inch thickness thermoplastic adhesive coat 26, for example, low density polyethylene, on the other side can form the inner layer 20. The stronger alloy and harder temper metal foil is preferred for maximum hoop strength. For example, 5052 H–19 aluminum alloy foil, 0.001 inch thickness, or annealed steel foil, 0.0015 inch thickness, is preferred. Generally, as stated above, a primer coat 30 is pre-applied to the outside surface 28 of the foil in order to facilitate good adhesion between the foil and the thermoplastic adhesive coat 26.

One to three plies of paperboard from about 0.0025 to 0.025 inch thickness with suitable pre-applied thermoplastic adhesive coats 38, 34 can form the middle layer 32, with the preferred construction utilizing one paper or paperboard ply. Whether the material comprising the middle layer 32 is characterized as "paper" or "paperboard" depends on the specific thickness selected to be employed in the present composite container body construction. It is common terminology in the paper industry to refer to the thinner materials as "paper" and the thicker materials of the same composition as "paperboard". The dividing point is approximately 0.005 inch, so that in connection with the present container body construction, thicknesses of paper range from 0.0025 to 0.005 inch and thicknesses of paperboard range from 0.005 to 0.025 inch. For sake of clarity, throughout the description herein, the middle layer 32 is referred to as "paperboard" with the understanding that technically the layer 32 may be either "paper" or "paperboard". Virgin kraft paperboard is preferred for maximum strength. Further, skived overlaps are preferred for maximum hoop strength from any given ply.

The thermoplastic adhesive coats 38, 34 which are preapplied to the paperboard are, for example, a 0.0008 inch thickness low density polyethylene coat 38 on the one side and a 0.0005 inch thickness high density polyethylene coat 34 on the other side. When the paperboard layer 32 is fabricated, the thermoplastic adhesive coat 38 on the inside surface 40 of the paperboard layer 32 forms a plastic-to-plastic bond 42 with the thermoplastic adhesive coat 26 on the outside surface 28 of the foil layer 20.

An extruded plastic, a polyolefin such as medium density polyethylene, from about 0.002 to 0.030 inch thickness, forms the outer layer 44. An adequate pigment level to prevent show-through of the substrate is usually desirable. 5 to 6 percent $TiO_2$ has been found to be adequate when using 0.004 to 0.006 inch thickness polyethylene. The thermoplastic adhesive coat 34 on the outside surface 36 of the paperboard layer 32 forms a plastic-to-plastic bond 46 with the outer layer 44.

The present preferred construction for packaging presterile beer, for instance, is a composite body wound with a single inner ply of 0.001 inch thickness strong aluminum alloy, for example, 5052 H–19 aluminum alloy, with an organic slip coat on the inside and a primer coat/0.0008 inch thickness low density polyethylene coat on the outside plus a single middle ply of 42 lb./ 1000 sq. ft. (MSF) (0.011 inch thickness) kraft paperboard with a 0.0008 inch thickness low density polyethylene coat on the inside and a 0.0005 inch thickness high density polyethylene coat on the outside plus a 0.004 to 0.006 inch thickness outer layer of medium density polyethylene.

III. Tensile and Yield Strengths and Thicknesses of Construction Materials

This new package advantageously allows the building-in of only as much strength as is required for the specific product being packaged by varying the strength of the inner metal foil layer 20. In other words, a container for orange soda, for instance, can be made weaker than a container for club soda. Since the degree of strength of the container is directly related to its cost, the basic advantage here is the ability to make a truly low cost container compared to the all-metal conventional containers.

The inner metal foil layer 20 and the middle paperboard layer 32 contribute most to the pressure-holding ability of the composite container body 12. The process for winding the layers together is versatile in that a variety of metal foil/paperboard combinations can be used depending on the strength properties desired in the finished container body. For example, metal foil/paperboard combinations having satisfactory pressure-holding capacity are: for presterile beer, an inner ply of 0.001 inch thickness, 5052 H–19 aluminum and a middle ply of 42 lb./MSF unbleached kraft paperboard; for orange soda, an inner ply of 0.001 inch thickness, 1100 H–19 aluminum and a middle ply of 42 lb./MSF unbleached kraft paperboard; and for club soda, an inner ply of 0.002 inch thickness, 1100 H–19 aluminum and a middle ply of 79 lb./MSF unbleached kraft paperboard. (See Examples 1 – 3 infra.)

The strength properties desired in the finished composite container body depend on the carbonation level, i.e., the content pressure, of the beverage desired to be packaged in the finished container. A metal foil/paperboard combination for a particular beverage must withstand the content pressures of that beverage. As an example, TABLE I lists content pressures of sample beverages (representing approximately the high, middle and low carbonation levels of beverages desired to be packaged) which range from a carbonation level of 4.0 volumes down to 2.0 volumes, as a minimum. Using the warranty temperature of 100° F. for carbonated beverages as a maximum (and also as a practical maximum for presterile beer), the internal container pressures listed also in TABLE I would be generated with 12 fluid ounces of beverage in a 211 × 413 container with carbonation at 50° F.

TABLE I

| Product | Volumes Carbonation | Temp. F. | Internal Can Pressure (psi) |
|---|---|---|---|
| Club Soda | 4.0 | 100 | 79 |
| Presterile Beer | 2.8 | 100 | 51 |
| Orange Soda | 2.0 | 100 | 33 |

For the metal foil layer, aluminum alloys having book value tensile and yield strengths listed below in TABLE II may be used.

TABLE II

| Foil Alloy & Temper | Tensile Strength (psi) | Yield Strength (psi) |
|---|---|---|
| 5052 H–19 | 46,000 | 37,000 |
| 3003 H–19 | 31,000 | 27,000 |
| 1100 H–19 | 26,000 | 22,000 |

A steel foil, such as listed in TABLE III below, with comparable tensile and yield strengths to the aluminum alloys listed in TABLE II may be used in the composite container body.

TABLE III

| Metal Foil & Temper | Tensile Strength (psi) | Yield Strength (psi) |
|---|---|---|
| steel foil, annealed | 45,000 | 35,000 |

Experience shows that actual strength values of the metal materials will exceed the book values given for the respective materials. Thus, the book strength values, being conservative estimates of the actual strength values, may validly be used in the calculations and analysis set forth hereinafter. For example, a comparison of test result values, given in TABLE VI infra, with the book strength values given for 5051 H–19 aluminum alloy shows the actual yield and tensile strengths to be much greater than the book values.

For the paperboard layer, three basis weights of unbleached kraft paperboard having the thicknesses and strengths listed in TABLE IV below may be used.

TABLE IV

| Basis Wt. lbs/MSF | Caliper (inch) | Machine (lbs/in) | Cross (lbs./in.) | Tensile Strength- 30° from M.D. (lbs./in.) | Yield Strength- 50% of 30° to MD (lbs./in.) |
|---|---|---|---|---|---|
| 42 | .0115 | 106 | 39 | 71 | 35 |
| 64 | .0169 | 140 | 66 | 107 | 53 |
| 79 | .0209 | 169 | 82 | 134 | 67 |

The tensile strength values listed in TABLE IV were obtained with the stress at 30° from the machine direction 30° being the normal spiral winding angle of the paperboard layer. 50 percent of the tensile strength value is a fair percentage to use in calculating the yield strength value in view of the effect of long-term loading of the paperboard layer.

The metal foil/paperboard combination is related to the maximum internal pressure-holding capability of the composite container body by the following equation:

$$(1) \quad P_{max} = \frac{1}{r_m} [(t_{metal})(y_{metal}) + (t_{paperbd})(y_{paperbd})]$$

where
$P_{max}$ = maximum internal pressure in the can (psi),
$r_m$ = mean radius of the can (inches),
$t$ = thickness of an individual layer (inches), and
$y$ = yield strength of an individual layer (psi).
Rearranging equation (1) gives:

$$(2) \quad (P_{max})(r_m) - (t_{metal})(y_{metal}) = (t_{paperbd})(y_{paperbd})$$

where $(P_{max})(r_m)$ is defined as the hoop "stress" in lbs./inch and $(t_{paperbd})(y_{paperbd})$ is defined as the strength value or yield strength in lbs./in. of a paperboard layer having a particular basis weight and caliper (thickness).

For a given metal foil selected from TABLE II above, equation (2) is used to calculate the strength contribution required from the paperboard layer For example: where $P_{max} = 51$ psi,
$r_m = 1.29$ inch,
$t_{alum.} = 1 \times 10^{-3}$ inch, and
$y_{alum.} = 37 \times 10^3$ psi, $$\left(51 \frac{\text{lb.}}{\text{in.}^2}\right)(1.29 \text{ in.}) - (1 \times 10^{-3} \text{ in.})\left(37 \times 10^3 \frac{\text{lb.}}{\text{in.}^2}\right)$$

$$= \frac{\text{lb.}}{\text{in.}} \text{ paperbd,}$$

$$66 \frac{\text{lb.}}{\text{in.}} - 37 \frac{\text{lb.}}{\text{in.}} = 29 \frac{\text{lb.}}{\text{in.}} \text{ paperboard.}$$

Therefore, a paperboard having a strength value of 29 lb./inch or greater must be used to provide the required additional strength. As listed in TABLE IV, one ply of 42 lb./MSF kraft paperboard has a 35 lb./inch strength value. Thus, paperboard having this basis weight and thickness would be adequate to use in combination with one ply of 0.001 inch thickness, 5052 H–19 aluminum alloy in order to withstand the 51 psi internal pressure.

TABLE V below lists the additional strength required to be provided by the paperboard and the particular paperboard material which will adequately fulfill this requirement for each container internal pressure and metal foil selected from TABLES I and II. From left to right, TABLE V lists the internal container pressure selected, the hoop "stress" (psi times the radius) in lbs./inch, and the difference between this stress and the strength provided by the metal foil, which difference is the strength still required to be provided by a paperboard. Below the difference value, the basis weight of the single ply of paperboard required to make up this difference is listed.

TABLE V

| can pres. "stress" (psi) | hoop (lb/in) | 5052 alloy 37,000 psi .001" | 5052 alloy 37,000 psi .002" | 3003 alloy 27,000 psi .001" | 3003 alloy 27,000 psi .002" | 1100 alloy 22,000 psi .001" | 1100 alloy 22,000 psi .002" |
|---|---|---|---|---|---|---|---|
| 33 | 42 | | | 42–37=5 42# | | 42–27=15 42# | 42–22=20 42# |
| 51 | 66 | 66–37=29 42# | | 66–27= 39 64# | 66–54= 12 42# | 66–22= 44 64# | 66–44= 22 42# |
| 79 | 101 | 101–37= 64 79# | 101–74= 27 42# | | 101–54= 47 64# | | 101–44= 57 79# |

The data of TABLE V can be rearranged, as in EXAMPLES 1 through 3 below, to illustrate the metal foil/paperboard combinations which are satisfactory for each of the sample products listed in TABLE I.

EXAMPLE NO. 1:

Orange Soda at 100° F.

Can Pressure - 33 psi; Hoop "Stress" - 42 lb/inch

| Possible Material Combinations | | Yield Strength (lbs/inch) | | | % strength contribution of Foil |
|---|---|---|---|---|---|
| Foil | Paperbd | Foil | Paperbd | Combined | |
| .001" 1100 H–19 | 42 lb/MSF | 22 | 35 | 57 | 39 |
| .001" 5052 H–19 | 42 lb/MSF | 37 | 35 | 72 | 51 |

EXAMPLE NO. 2:

Presterile Beer at 100° F.

Can Pressure - 51 psi; Hoop "Stress" - 66 lb/inch

| Possible Material Combinations | | Yield Strength (lbs/inch) | | | % Strength Contribution of Foil |
|---|---|---|---|---|---|
| Foil | Paperbd | Foil | Paperbd | Combined | |
| .001" 5052 H–19 | 42 lb/MSF | 37 | 35 | 72 | 51 |
| .001" 3003 H–19 | 64 lb/MSF | 27 | 53 | 80 | 34 |
| .002" 1100 H–19 | 42 lb/MSF | 44 | 35 | 79 | 56 |

EXAMPLE NO. 3:

Club Soda at 100° F.

Can Pressure - 79 psi; Hoop "Stress" 101 lb/inch

| Possible Material Combinations | | Yield Strength (lbs/inch) | | | % strength contribution of foil |
|---|---|---|---|---|---|
| Foil | Paperbd | Foil | Paperbd | Combined | |
| .001" 5052 H–19 | 79 lb/MSF | 37 | 67 | 104 | 36 |
| .002" 1100 H–19 | 79 lb/MSF | 44 | 67 | 111 | 40 |
| .002" 5052 H–19 | 42 lb/MSF | 75 | 35 | 109 | 68 |

As shown in EXAMPLES NOS. 1 – 3 above, the last column thereof, another advantage of this new container is that a great deal of its strength comes from the metal foil layer 20, whose basic function, traditionally, is to provide a gas and liquid barrier. Conventional spirally-wound containers use thin, paper-backed, soft metal foil inner liners, the metal being on the order of thickness from about 0.00030 to 0.00075 inch, attempting to build up the needed strength by the use of multiple plies of paperboard. The present composite container body, in part, uses a relatively thick, strong metal foil, whose thickness is approximately 0.001 inch, in a spirally-wound, single ply form and only a single ply of a relatively thin, spirally-wound paperboard. Thus, the metal foil layer 20 provides substantial strength to the total container as well as a substantially better gas and liquid barrier in a package considerably thinner than most conventional composite containers.

The test results in regard to actual mechanical properties of the foil layer 20 are given below in TABLE VI, wherein aluminum alloy 5052 H–19, 0.001 inch thickness, was the metal foil tested. Foil layer portions tested were cut circumferentially and vertically from the composite container body wall and stripped of all coats and other layers. The heat treatment given this foil layer during conversion thereof from its "as received" prefabrication condition to its final condition as a component in the construction of the finished composite container body was 450° F. maximum for 20 seconds. The properties of the foil in its "as received" condition are also given in TABLE VI. The foil layer strips were tested at 30° and 60° to the original rolling direction.

TABLE VI

|  |  | Yield Strength | Tensile Strength | Elongation in 2 inches |
|---|---|---|---|---|
| As Rec'd | 30° | 53,000 psi | 53,500 psi | 1% |
| As Rec'd | 60° | 53,600 | 58,100 | 1⅛% |
| Foil Layer Portion (Circumf.) | 30° | 49,700 | 54,100 | 2½% |
| Foil Layer Portion (Vertical) | 60° | 51,700 | 54,900 | 2% |

IV. Burst or Blow-Up Strength and Vertical Crush Resistance of the Composite Container Body The single ply of spirally-wound paperboard provides a significant amount of the composite container burst strength and most of the vertical crush resistance. Results of tests given below in TABLE VII show that these properties of the composite container body are above the accepted minimum standards.

TABLE VII

A. Blow-up Strength - Room Temperature

| Composite body having .002" 3003 H-19 foil | - 142 psi |
| Composite body having .001" 5051 H-19 foil | - 132 psi |

(All composite bodies had 42# kraft paperboard and 5 mils MDPE outer layer. Minimum requirements are 70 to 90 psi, with contents, on a continuous basis at 100° F.)

B. Vertical Crush Resistance

|  | Without Ends | With Two Ends, No contents |
|---|---|---|
| Composite body having 001" 5052 H-19 foil | 168 lbs | 255 lbs |

Some materials, such as paperboard, are much stronger in one direction than in the other. The spiral angle of the plies permits orienting the strong direction to give a balance between crush and burst strength with an opportunity to alter the balance in favor of either.

V. Weight of the Composite Container Body

A further advantage of this novel composite body is illustrated in TABLE VIII by a comparison of the average weight of the present composite body with the average weights of two standard types of commercial all-metal container bodies.

TABLE VIII

| Soldered tinplate container body | 33.428 grams |
| TFS adhesively-bonded, lap seam container body | 33.079 |
| Present Composite Body | 11.276 |

This comparison shows approximately a one-to-three weight ratio of the present composite body to each of the others. Therefore, the lighter weight of the present composite container body involves a substantial saving in economy relative to raw materials, finished product transportation costs and floor strength requirements of manufacturing and storage facilities.

VI. Heat Transfer Characteristics of the Composite Container Body

By the use of a single ply of thicker, stronger foil, and of a single ply of relatively thin paperboard, as noted above, the present composite body is considerably thinner than most conventional composites, which provides the added advantage to this over-all package of improved heat transfer characteristics. Paperboard is a relatively poor heat conductor when compared with metal. These substantially improved heat transfer characteristics are reflected, for instance, in terms of the rate of pasteurization for beer and the rate of chilling under refrigerated conditions. At the same time, the outer plastic exterior provides a warm feeling to the consumer's hand, and prevents rapid transfer of heat from the hand to the contents of the container. Consequently, the ideal characteristics for a container package for beer or carbonated beverages are provided in that it chills as rapidly as metal under average refrigerator conditions, but it warms up more slowly when held in the hand. Its heat transfer characteristics are also better than those of plastic bottles.

For example, the heat transfer properties of this new composite container for packaging presterile beer are far superior to the mainly fiber composite can. Refrigeration tests show that this new composite is comparable to the metal can in cooling rate, with the plastic bottle lagging both. On free air warming from refrigerated storage, all three containers warm at almost the same rate. However, when each was hand held, this new composite body warmed slowest of all, and according to the test participants, it and the plastic bottle were much more comfortable to hold than the metal can. Pasteurization tests on these containers filled with water were run both at 140° F. and also with a 160° F. superheat. Results at 140° F. show that the new composite container was slower by 7 minutes and the plastic bottle slower by 15 minutes than the metal can in achieving the same number of pasteurization units. With a 160° F. superheat, the time difference between the metal can and the new composite container decreased to 3½ minutes.

VII. Moisture Barrier Properties of the Composite Container Body

In conventional composite containers, the multiple paperboard plies are usually kept dry by the use of a foil label or, in non-critical uses, by a polyethylene coated paperboard label. In the present composite container, the seamless exterior of the polyethylene outer layer, among other advantages, is an excellent way of providing a good barrier against outside moisture penetration to the paperboard ply and gives no corrosion problems.

VIII. Safety Feature of the Composite Container Body

Another advantage is that the plastic layer, while having the ability to keep the paperboard layer dry, may also serve as a safety means for providing protection against the type of disastrous failure often encountered with conventional composite containers packed with carbonated products. Conventional multi-ply, spirally-wound paperboard containers designed to hold beer or carbonated beverages tend to fail disastrously if a flaw in the metal foil creates a means whereby the paperboard plies become moistened with the pressurized fluid product and thus lose their strength. The ensuing failure with conventional container usually takes the form of gross leakage of liquid out of the container, or actual bursting, if temperatures are high enough. In the case of the present composite container body, the relatively thick, seamless outer plastic layer tends to prevent the loss of liquid, and may swell outwardly without leaking if there is damage to the metal foil layer and a weakening of the paperboard layer.

IX. Decorative and Aesthetic Features of the Composite Container Body

Finally, the decorative and aesthetic advantages of the present composite body over conventional types are several. The paperboard can be easily skived to make a smooth joint when spirally-would into layer form. In other words, the skived paperboard will give a smooth outer surface to the paperboard layer that is to be extrusion coated with the plastic outer layer. Skiving both edges of the paperboard allows the use of an overlap for strength purposes while maintaining essentially a single ply thickness in the overlap.

The outer plastic layer provides a more corrosion resistant surface than any coated metal container. Since it is not necessary to protect the entire outer surface with ink and varnish for corrosion reasons, spot labelling confined to an area 25 percent or less of that of the entire body can be utilized with attendant economies and versatility of change. Further, the thick plastic layer can produce a depth of color unobtainable in metal can lithography. It is possible to alter the appearance of the container merely by changing the plastic color without altering the printing plate or the spot label.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred or exemplary embodiment thereof.

What is claimed is:

1. A composite container body for packaging pressurized fluid materials, comprising:
    a ply of thick, strong metal foil forming an inner layer of the composite body;
    a ply of paperboard forming a middle layer of the composite body; and
    a layer of plastic forming the outer layer of the composite body, the outside surface of said foil layer adhering to the inside surface of said paperboard layer by means of a plastic-to-plastic bond, and the outside surface of said paperboard layer adhering to the inside surface of said plastic layer by means of a plastic-to-plastic bond.

2. A composite container for packaging pressurized fluid materials according to claim 1, wherein:
    said plastic layer is seamless.

3. A composite container body for packaging pressurized fluid materials according to claim 1, wherein:
    said plastic layer is a layer of thermoplastic.

4. A composite container body for packaging pressurized fluid materials according to claim 1, wherein:
    said plastic layer is a layer of polyolefin.

5. A composite container body for packaging pressurized fluid materials according to claim 1, wherein:
    said plastic layer is a layer of polyethylene.

6. A composite container body for packaging pressurized fluid materials according to claim 1, wherein:
    said plastic layer is a layer of pigmented plastic.

7. A composite container body for packaging pressurized fluid materials according to claim 1, wherein:
    said plastic layer is an extruded layer of plastic.

8. A composite container body for packaging pressurized fluid materials according to claim 1, wherein:
    said plastic layer is a layer of thermoplastic combinations.

9. A composite container body for packaging pressurized fluid materials according to claim 1, wherein:
    said foil layer is a spirally-wound ply;
    said paperboard layer is a spirally-wound ply; and
    said plastic layer is seamless.

10. A composite container body for packaging pressurized fluid materials according to claim 1, wherein:
    said metal foil layer is a ply of a strong aluminum alloy of approximately 0.001 inch thickness;
    said paperboard layer is a ply of 42 lb./MSF unbleached kraft paperboard of approximately 0.011 inch thickness; and
    said plastic layer is a layer of polyolefin having a thickness within the range of 0.002 to 0.030 inch.

11. A composite container body for packaging pressurized fluid materials according to claim 1, further comprising:
    said foil layer having an organic slip coat on its inside surface and a thermoplastic adhesive coat on its outside surface; and
    said paperboard layer having a thermoplastic adhesive coat on its inside and its outside surfaces.

12. A composite container body for packaging pressurized fluid materials according to claim 1, further comprising:
    an organic slip coat on the inside surface of said foil layer;
    a first thermoplastic adhesive coat on the outside surface of said foil layer;
    a second thermoplastic adhesive coat on the inside surface of said paperboard layer; and
    a third thermoplastic adhesive coat on the outside surface of said paperboard layer.

13. A composite container body for packaging pressurized fluid materials, comprising:
    a ply of thick, strong metal foil forming an inner layer of the composite body;
    a ply of paperboard forming a middle layer of the composite body, the outer surface of said foil layer being adhered to the inside surface of said paperboard layer by means of a plastic-to-paper bond; and
    a layer of plastic forming the outer layer of the composite body, the outside surface of said paperboard layer being adhered to the inside surface of said plastic layer by means of a plastic-to-plastic bond.

14. A composite container body for packaging pressurized fluid materials according to claim 13, further comprising:
    said foil layer having an organic slip coat on its inside surface and a thermoplastic adhesive coat on its outside surface;
    said paperboard layer having a thermoplastic adhesive coat on its outside surface.

15. A composite container for packaging pressurized fluid materials having a composite body sealed with top and bottom metal end closures, comprising:

a ply of thick, strong metal foil forming an inner layer of the composite body, said layer having an organic slip coat on its inside surface and a thermoplastic adhesive coat on its outside surface;

a ply of paperboard forming a middle layer of the composite body, said paperboard layer having a thermoplastic adhesive coat on its inside surface and its outside surface, the outside surface of said foil layer being adhered to the inside surface of said paperboard layer by means of a plastic-to-plastic bond;

a layer of plastic forming the outer layer of the composite body, the outside surface of said paperboard layer being adhered to the inside surface of said plastic layer by means of a plastic-to-plastic bond; and top and bottom metal end closures sealed to opposite ends of the composite body.

16. A composite container for packaging pressurized fluid materials according to claim 15, wherein:

said metal foil layer is a ply of a strong aluminum alloy of approximately 0.001 inch thickness;

said paperboard layer is a ply of 42 lb./MSF unbleached kraft paperboard of approximately 0.011 inch thickness; and said plastic layer is a layer of polyolefin of a thickness within the range of 0.002 to 0.030 inch.

17. A composite container for packaging pressurized fluid materials having a composite body sealed with top and bottom metal end closures, comprising:

a ply of thick, strong metal foil forming an inner layer of the composite body;

an organic slip coat on the inside surface of said metal foil layer;

a first thermoplastic adhesive coat on the outside surface of said metal foil layer;

a ply of paperboard forming a middle layer of the composite body;

a second thermoplastic adhesive coat on the inside surface of said paperboard layer;

a third thermoplastic adhesive coat on the outside surface of said paperboard layer;

a first plastic-to-plastic bond between the outside surface of said metal foil layer and the inside surface of said paperboard layer;

a layer of plastic forming the outer layer of the composite body;

a second plastic-to-plastic bond between the outside surface of said paperboard layer and the inside surface of said plastic layer; and top and bottom metal end closures sealed to opposite ends of the composite body.

18. A composite container for packaging pressurized fluid materials according to claim 17, wherein:

said metal foil layer is a ply of a strong aluminum alloy of approximately 0.001 inch thickness;

said first thermoplastic adhesive coat on the outside surface of said foil layer is a low density polyethylene of approximately 0.0008 inch thickness;

said paperboard layer is a ply of 42 lb./MSF unbleached kraft paperboard of approximately 0.011 inch thickness;

said second thermoplastic adhesive coat on the inside surface of said paperboard layer is a low density polyethylene of approximately 0.0008 inch thickness;

said third thermoplastic adhesive coat on the outside surface of said paperboard layer is a high density polyethylene of approximately 0.0005 inch thickness; and said plastic layer is a layer of polyolefin of a thickness within the range of 0.002 to 0.030 inch.

19. In a composite container body for packaging pressurized fluid materials, the combination of structural materials which provide substantially all of the internal pressure-holding capability of the composite container body, comprising:

a ply of thick, strong metal foil forming an inner layer of the composite body, said foil being spirally-over-lapped onto itself to form the foil layer with the inside surface of the metal foil being adhered to the outside surface of the metal foil in the area of overlap by means of an organic slip coat-to-plastic bond; and a ply of paperboard forming a middle layer of the composite body, said paperboard having skived edges which are spirally-overlapped to form the paperboard layer having a substantially uniform single ply thickness, said skived edges being adhered to one another by means of a plastic-to-plastic bond.

20. In a composite container body, according to claim 19, wherein:

said metal foil layer is a ply of a strong aluminum alloy of approximately 0.001 inch thickness; and said paperboard layer is a ply of 42 lb./MSF unbleached kraft paperboard of approximately 0.011 inch thickness.

21. In a composite container body, according to claim 19, wherein:

the outside surface of said foil layer is adhered to the inside surface of said paperboard layer by means of a plastic-to-plastic bond.

22. In a composite container body for packaging pressurized fluid materials, the combination of structural materials which provide substantially all of the internal pressure-holding capability of the composite container body, comprising:

a ply of thick, strong metal foil forming an inner layer of the composite body, said layer having an organic slip coat on its inside surface, a thermoplastic adhesive coat on its outside surface, and a primer coat between the outside surface of said foil and said thermoplastic adhesive coat; and a ply of paperboard forming a middle layer of the composite body, said paperboard layer having a thermoplastic adhesive coat on its inside surface, the outside surface of said foil layer being adhered to the inside surface of said paperboard layer by a plastic-to-plastic bond.

23. A composite container body for packaging presurized fluid materials, comprising:

a ply of thick, strong, metal foil forming an inner layer of the composite body, said ply of foil being spirally-overlapped onto itself to form the foil layer with the inside surface of the metal foil being adhered to the outside surface of the metal foil in the area of overlap by means of an organic slip coat-toaplastic bond;

a ply of paperboard forming a middle layer of the composite body, said paperboard ply having skived edges which are spirally-overlapped to form the paperboard layer having a substantially uniform, single ply thickness, said skived edges being adhered to one another by means of a plastic-to-plastic bond; and a layer of plastic forming the outer layer of the composite body.

24. A composite container body for packaging pressurized fluid materials, comprising:

a ply of strong aluminum alloy approximately 0.001 inch thick forming an inner layer of the composite body;

an organic slip coat on the inside surface of said aluminum alloy layer;

a low density polyethylene approximately 0.0008 inches thick on the outside surface of said aluminum alloy layer;

a ply of 42 lb./MSF unbleached kraft paperboard approximately 0.011 inch thick forming a middle layer of the composite body;

a low density polyethylene approximately 0.0008 inch thick on the inside surface of said paperboard;

a high high density polyethylene approximately 0.0005 inch thick on the outside surface of said paperboard; and a layer of polyolefin 0.002 to 0.030 inch thick forming the outer layer of the composite body.

25. A composite container body for packaging pressurized fluid materials, comprising:

a ply of thick, strong metal foil forming an inner layer of the composite body, said foil having an organic slip coat on the inside surface and a first, thermoplastic adhesive coat on its outside surface;

a ply of paperboard forming a middle layer of the composite body, said paperboard having a second, thermoplastic adhesive coat on its inside surface and a third, thermoplastic adhesive coat on its outside surface;

a layer of plastic forming the outer layer of the composite body; and a primer coat between said first, thermoplastic adhesive coat and the outside surface of said metal foil.

26. In a composite container body for packaging pressurized fluid materials, the combination of structural materials which provide substantially all of the internal pressure-holding capability of the composite container body, comprising:

a ply of thick, strong metal foil having an organic slip coat on its inside surface, a thermoplastic adhesive coat on its outside surface and being spirally-overlapped onto itself, said foil forming an inner layer of the composite body with the inside surface of the metal foil being adhered to the outside surface of the metal foil in the area of overlap by means of an organic slip coat-to-plastic bond; and a ply of paperboard having skived edges spirally-overlapped forming a substantially uniform single ply thickness middle layer of the composite body, said paperboard layer having a thermoplastic adhesive coat on its inside surfaces, said skived edges being adhered to one another by means of a plastic-to-plastic bond, and the outside surface of said foil layer being adhered to the inside surface of said paperboard layer by a plastic-to-plastic bond.

27. In a composite container body, according to claim 26, wherein:

said metal foil layer is a ply of a strong aluminum alloy of approximately 0.001 inch thickness;

said thermoplastic adhesive coat on the outside surface of said foil layer is a low density polyethylene of approximately 0.0008 inch thickness;

said paperboard layer is a ply of 42 lb./MSF unbleached kraft paperboard of approximately 0.011 inch thickness; and said thermoplastic adhesive coat on the inside surface of said paperboard layer is a low density polyethylene of approximately 0.0008 inch thickness.

* * * * *